Oct. 17, 1967  E. R. SCHUMANN ETAL  3,347,062
TORQUE LIMITING MECHANISM
Filed Sept. 28, 1965

Inventors:
Eugene R Schumann,
Liudas Varagas,
By Hume, Groen, Clement & Hume.
Attys 3,347,062
TORQUE LIMITING MECHANISM
Eugene R. Schumann, Franklin Park, and Liudas Vanagas, Chicago, Ill., assignors to The Powers Regulator Company, Skokie, Ill., a corporation of Illinois
Filed Sept. 28, 1965, Ser. No. 490,970
4 Claims. (Cl. 64—28)

ABSTRACT OF THE DISCLOSURE

A torque limiting mechanism. Hexagonal members are attached to the adjacent ends of a drive shaft and a driven shaft. A triangular spring with one apex removed simultaneously embraces alternate faces of the hexagonal members. When the torque between the shafts reaches a predetermined maximum, the resiliency of the spring is overcome, permitting relative rotation between the shafts.

---

Our invention pertains to a torque limiting mechanism.

Where torque is transmitted from a prime mover to a load by means of rotatable drive members, it frequently happens, due to accident or other unforeseen occurrences, that the load may become so great that it exceeds the design limitations of the drive members or the prime mover. In order to prevent damage to these elements or to the load instrumentalities and other associated gear, it has often been found desirable to provide means for limiting the magnitude of transmitted torque. Torque limiting devices have also been found useful in situations where it is desired to apply a predetermined amount of torque to a particular load; for example, in the tightening of nuts and the like.

There has been a variety of approaches to the problem of designing such a device. However, the resultant devices have proved to be complicated and cumbersome for many applications and generally require a large number of component parts. Prior designs have also called for extreme precision in the manufacture and assembly of such devices, and have necessitated the use of expensive materials and machining and fabricating techniques. All of the foregoing factors have contributed towards the maintenance of prohibitively high manufacturing, installation and repair costs for many applications.

Moreover, utilization of such prior devices has been limited to the particular application for which they were designed; there has been no provision for adaptability to a large number of applications. In addition, difficult assembly and installation procedures have largely prohibited ready interchangeability and have maximized the time and effort required for maintenance and repair.

Previous designs have also been characterized by inherent defects in design, manifesting themselves in such drawbacks as lack of positive, stable transmission contact with drive elements, excessive "slop" and reversal losses, lack of inherent centering capability, and so forth.

It is therefore an object of our invention to provide a torque limiting mechanism characterized by extreme simplicity of design and economy of manufacture.

It is a further object of our invention to provide a torque limiting mechanism having a minimum of component parts.

It is still a further object of our invention to provide a torque limiting mechanism which finds utility in a wide variety of applications, and which is readily interchangeable in and adapted to be used with any number of different combinations of prime mover, load, and torque transmission elements.

It is yet another object of our invention to provide a torque limiting mechanism which is rugged and durable, and which is characterized by easy assembly and installation.

Our invention also has as an object the provision of a torque limiting mechanism which is virtually free from reversal losses, which has inherent centering capabilities, and which maintains continuous positive contact between drive elements under normal load conditions.

In accordance with our invention, these and other objects are achieved by the combination of a triangular spring and hexagonal members mounted upon the ends of the driving and driven members. The spring is adapted to embrace the hexagonal members, thus providing positive planar contact between the three legs of the spring and alternate polygonal faces of the hexagonal members. So long as the torque remains below a predetermined level, it is transmitted from the driving member through the triangular spring to the driven member. However, when the torque exceeds this predetermined maximum, the hexagonal members exert a radial force upon the spring sufficient to spread the legs of the spring apart, thus permitting relative rotation of the driving member with respect to the driven member. A fuller understanding of the structure and operation of our invention may be had by referring to the following description and claims, taken in conjunction with the accompanying drawings, in which:

Figure 1:
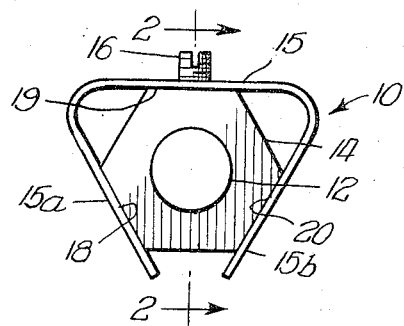
FIGURE 1 is a elevational view of one end of a torque limiting mechanism constructed in accordance with our invention.
Figure 2:
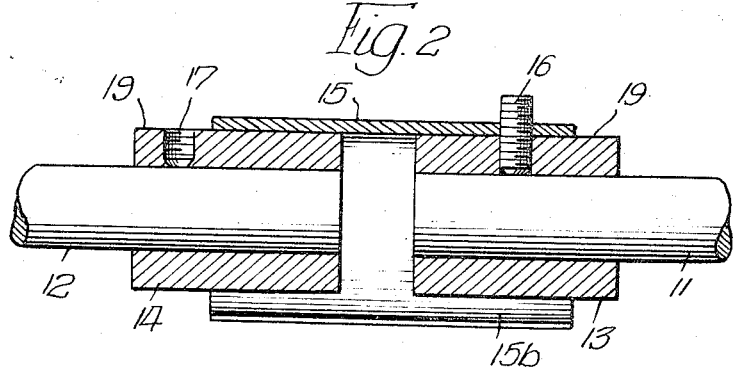
FIGURE 2 is a cross-sectional view of the same mechanism taken on the plane of the line 2—2 of FIGURE 1.

FIGURES 1 and 2 illustrate a torque limiting mechanism which embodies our invention. As seen therein, the spring 15 is adapted to embrace hexagonal members 13 and 14 which are mounted on the ends of shafts 11 and 12 respectively. As is best shown in FIGURE 1, the spring 15, when embracing the hexagonal members, has the general configuration of an equilateral triangle with one of the apexes removed. Indeed, the shape of the spring 15 might be more aptly described as being similar to a rack for billiard balls with one of the corners missing. The legs 15a and 15b of the springs 15 are adjacent the open apex and, if extended, would close the triangle. Thus, while the normal embracing configuration of the spring 15 is as shown in FIGURE 1, the legs 15a and 15b are free for movement in response to forces exerted thereon.

Although the spring 15 is described as having the general configuration of an equilateral triangle, this is merely a convenient method of describing its general shape. Actually, it is preferable that the acute angles formed by the intersection of the legs 15a and 15b with the third leg being somewhat less than 60° when the spring 15 is fabricated; this will insure that the three legs of the spring 15 will securely embrace the hexagonal members 13 and 14 when the spring is mounted thereon. Nor is it critical that the legs of the spring 15 be of precisely the same length. The only absolutely essential requirement is that the spring 15 be so constructed that, when it is mounted on the hexagonal members 13 and 14, three legs of the spring will be in positive planar contact with alternate polygonal faces of the hexagonal members. Those skilled in the art will recognize that the actual shape of the spring 15 may be appreciably varied without destroying its effectiveness in fulfilling this essential requirement.

As shown in FIGURE 2, the hexagonal members 13 and 14 are mounted upon the ends of shafts 11 and 12 respectively, and held in place by set screws 16 and 17 respectively. While the use of set screws is shown, any suitable means may be employed for fixing the hexagonal members 13 and 14 to the ends of the shafts 11 and 12. The hexagonal members might also be permanently fixed to the shafts, as by welding or the like, or the shafts themselves might be formed with integral hexagonal end portions.

As shown in FIGURE 2, the set screw 16 also serves to hold the spring 15 in place with respect to the hexagonal member 13. It should be apparent, however, that this is not an essential feature. Means for holding the spring 15 stationary with respect to one of the hexagonal members 13 and 14 could be dispensed with entirely. The only essential requirement is that at least one of the hexagonal members be free for movement relative to the spring 15 upon the application of excessive torque.

The torque limiting mechanism shown in the drawings operates as follows: the shaft 11 could be, for example, the driven member in a torque transmitting system, and would thus be attached to the load. The shaft 12 could be, for example, the driving member, and would thus be attached to the prime mover. Under normal load conditions, wherein the torque remains below a predetermined maximum value, the torque would be transmitted through the rotation of the shaft 12, to the hexagonal member 14, thence through the spring 15, to the hexagonal member 13, and thus to the shaft 11. Under such conditions, the legs of the spring 15 would maintain positive planar contact with the alternate polygonal faces 18, 19 and 20 of the hexagonal members. Although the tendency of the hexagonal members 13 and 14 to rotate relative to one another will cause a constant force tending to flex the legs 15a and 15b of the spring 15, the resiliency of the spring is sufficient to prevent appreciable flexing and will thus prevent movement of either of the hexagonal members with respect to the spring and to one another so long as the torque remains below the predetermined maximum value.

Figure 3:
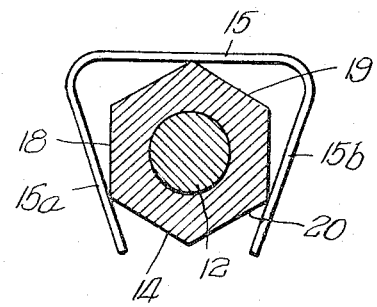
FIGURE 3 is a view similar to that in FIGURE 1, but showing the configuration of the mechanism under conditions of excessive torque.

However, when the torque exceeds the predetermined maximum value, the force exerted by the hexagonal members tending to flex the legs 15a and 15b of the spring 15 will be sufficient to overcome the resiliency of the spring. Therefore, the legs 15a and 15b will be forced apart as shown in FIGURE 3, and the hexagonal member 14 will be free for limited movement within the spring. As is apparent from an examination of FIGURE 3, the hexagonal member 14 will be allowed to move in successive steps of ⅙ of a revolution for as long as the torque remains above the maximum predetermined value. Thus, the effect is that the driving shaft 12 is able to rotate with respect to the driven shaft 11. In this way, the excessive torque is taken up in flexing the legs 15a and 15b of the spring 15 and the equipment is protected from damage.

Should the applied torque fall below the maximum predetermined value, three alternate faces of the hexagonal member 14 will again immediately assume positive planar contact with the legs of the spring 15. Since this planar contact is exerted on three alternate faces of the hexagonal member 14, and since the forces exerted by the legs of the spring 15 are normal to the contact faces and directed towards the center of the shaft 12, it is apparent that the hexagonal member 14 and the shaft 12 will automatically be centered within the confines of the spring 15. Thus, positive planar contact is automatically and immediately restored when the load returns to normal. This feature is particularly useful in applications where either one or both of the shafts 11 and 12 are not mounted stationary with respect to the ground. Thus, our invention is very well adapted for use with flexible drive shafts. The inherent centering capability of the mechanism will cause the shafts 11 and 12 to maintain a common longitudinal axis within the confines of the spring 15, even immediately after conditions of severe overload.

Also, because of the nature and direction of the forces exerted by the spring 15, the mechanism is relatively insensitive to transient load increases. Thus, upon abrupt reversal in the direction of rotation of the shaft 12, or upon abrupt increase in applied torque, the legs of the spring 15 maintain continuous planar contact with the alternate polygonal faces 18, 19 and 20 of the hexagonal member 14. In this way, slop and reversal losses are minimized.

We have found that the use of a triangular spring in conjunction with a hexagonal member, as described above, possesses certain inherent advantages over other possible configurations, such as a hexagonal spring. Because positive planar contact is an absolute requisite, it is much more difficult to fabricate a hexagonal spring which will provide such contact; in a hexagonal spring, the lengths of the sides and the included angles are very critical and are much more difficult to form with precision than in a triangular spring, for the same reason that it is more difficult to inscribe a hexagon with compass and straight edge than it is to inscribe an equilateral triangle. Moreover, one of the legs of a triangular spring could be made longer or shorter than the others without impairing positive planar contact of the legs with the alternate faces of the hexagonal member; the resiliency of the spring would urge the legs into positive planar contact. The same is not true in the case of a hexagonal spring.

From the foregoing discussion, it should be apparent that our invention is extremely versatile, in that it can be used in an almost endless variety of applications. Our torque limiting mechanism is uncomplicated, easy and economical to manufacture, has a minimum number of component parts, is simple to assemble and install, and overcomes the inherent defects of prior designs.

Although we have described our invention with a certain degree of particularity, it should be understood that the present disclosure has been made only by way of example. Consequently, numerous changes in the details of construction and the composition and arrangement of parts will be obvious to those having ordinary skill in the art, and may be resorted to without departing from the spirit and scope of the invention as claimed.

We claim:

1. A torque limiting mechanism comprising: a driving shaft and a driven shaft; a pair of members of hexagonal cross section each adapted to be fixedly attached to an end of one or the other of said shafts; and a spring, said spring having a general configuration of an equilateral triangle with one of the apexes of said triangle removed to permit limited resilient movement of two legs of said triangle, said spring being adapted to embrace each of said hexagonal members simultaneously, with positive planar contact between each of the three legs of said spring and alternate polygonal faces of said hexagonal member, so that torque may be transmitted from said driving shaft to said driven shaft, and said spring having sufficient resiliency such that when the torque reaches a predetermined value, two of the legs of said spring will be forced apart by the hexagonal members, thus destroying said positive planar contact and permitting relative rotation of said driving shaft and said driven shaft.

2. The torque limiting mechanism of claim 1, wherein said spring is fixedly attached to one of said hexagonal members.

3. A torque limiting mechanism comprising a pair of rotatable torque transmitting instrumentalities and means for resisting relative rotation between said instrumentalities; wherein an end portion of each of said instrumentalities is of essentially the same hexagonal cross-section, said hexagonal end portions being substantially axially aligned and spaced; and wherein said means comprises a strip of resilient material formed to a shape having a plurality of legs with two of said legs free for relative resilient movement, said strip being adapted to simultaneously embrace only three alternate polygonal faces of each of said hexagonal end portions.

4. The torque limiting mechanism of claim 3, wherein said strip of resilient material is fixedly attached to one of said hexagonal end portions.

References Cited

UNITED STATES PATENTS

| | | | |
|---|---|---|---|
| 1,092,574 | 4/1914 | Jansson | 64—29 |
| 2,441,038 | 5/1948 | Siesel | 64—29 |
| 2,688,857 | 9/1954 | Jones | 64—29 |
| 2,826,903 | 3/1958 | Gerstung et al. | 64—29 |
| 3,157,258 | 11/1964 | Cronholm | 64—28 |

HALL C. COE, *Primary Examiner.*